Patented Mar. 20, 1928.

1,663,504

UNITED STATES PATENT OFFICE.

WILLIAM H. MASON, OF LAUREL, MISSISSIPPI, ASSIGNOR TO MASON FIBRE COMPANY, OF LAUREL, MISSISSIPPI, A CORPORATION OF DELAWARE.

PRESS-DRIED STRUCTURAL INSULATING BOARD AND PROCESS OF MAKING SAME.

No Drawing.  Application filed September 18, 1925. Serial No. 57,251.

My invention relates to a press dried structural insulating board.

My improved structural insulating board is made from ligno-cellulose fiber, preferably wood fiber. The fiber is preferably prepared by explosion from a gun through a constricted outlet or outlets under high pressure, preferably steam pressure of about 275#-1000# per sq. in., but the wood may be ground or fibrated in other ways, so long as the lignins or the principal part thereof are retained, and the fibers are not unduly chopped or shortened. Chemically digested fiber, from which the lignins have been substantially removed, is not well adapted for the purposes of my invention. The presence of lignins is desirable, since this constituent under proper conditions of heat, moisture and pressure supplies a cementitious or welding effect, particularly at and toward the surfaces when the product is dried, as hereinafter described. The fiber may be refined as by being beaten or hydrated, if desired, but preferably it is fairly coarse, and highly extensive refinement is preferably avoided.

The fiber is soaked in water and formed into a sheet. Part of the excess water is preferably removed, as by passing the fiber in sheet form between rolls, sizing material and/or materials for imparting fire resistant qualities being incorporated in the soaking water, if desired.

The fiber sheet is dried in a heated press. Preferably the fiber sheet is cut into lengths as desired, usually lengths of 8 to 12 feet, and the sections introduced into a heated press, as, for example, between steam heated press platens. Sufficient pressure is applied to compress the sections to the thickness required and iron out the surfaces so that they will remain true.

The press is preferably arranged to produce boards or sheets of predetermined thickness. For example, in the production of board of a thickness of slightly under ½" stops are provided or spacer blocks ½" thick are inserted between the press platens, so that the movement of the platens is stopped when the blocks are encountered and the fiber sections are compressed and dried in the press to approximately ½" in thickness. Only a moderate amount of pressure is required for this purpose, as, for example, sufficient pressure to reduce the sheets in thickness from about ¾" after leaving the squeezing rolls to about ½", a pressure of 5#-15# per sq. in., being amply sufficient for this purpose. With heated platens containing steam at about 70#-110# per sq. in., and at corresponding temperature, good results have been obtained, the drying being complete in about 40 minutes with about 100#-110# of steam in the press platens. Toward the end of the drying operation and apparently after the water has been reduced to or below the fiber saturation point, the fibers have become set and the board no longer requires application of pressure, but only heat to complete the drying. The board when dried is of slightly less than the predetermined thickness or gage provided between the press platens, as by means of distance blocks.

Board produced in the manner described has very excellent surface qualities, and has good surface density, strength and stiffness. While the insulating board so produced is porous throughout, the density at the surface is greatly in excess of that about midway between the two surfaces. In this way the board is not only made available for use without additional surface finishes or coatings, if desired, but it is also made very much stronger and much less readily bent or broken than board which is dried free from restraint. The skins of relatively dense and strong material, impart high strength and stiffness to the finished board, notwithstanding the more porous condition of the board in the middle, away from the surface layers. The production of board of predetermined thickness and having smooth, true surfaces, made possible in the manner described, is a factor of importance, in that it eliminates what are perhaps the greatest objections to insulating board as heretofore produced, namely, the variation from true surfaces and also variation in thickness, which are highly objectionable features and are inherent in boards which are not equalized by hot platens as described above.

Cognate subject-matter not claimed herein is embraced in my companion copending applications as follows:

Ser. No. 38,356, filed June 19, 1925; Ser. No. 57,252, filed Sept. 18, 1925; Ser. No. 90,167, filed Feb. 23, 1926; Ser. No. 91,447, filed March 1, 1926.

I claim:

1. An integral, stiff, strong, structural insulating board, made from ligno-cellulose fiber exploded from under high pressure, and containing at least a greater part of its original lignins, dried under heat and pressure, and which, while porous throughout, comprises an inner portion of relatively high porosity, and denser, harder and stronger surface portions of relatively lower porosity enclosing said inner portion.

2. Structural insulating board of wood fiber exploded under high pressure and which, while porous throughout has skin portions of stiffness and strength greater than the inner portion intermediate of said skin portions.

3. An integral, stiff, strong, structural insulating board, made of wood fiber exploded from under high pressure and which, while porous throughout, comprises an inner portion of relatively high porosity, and denser, harder and stronger surface portions of relatively lower porosity enclosing said inner portion.

4. Process of making a true surfaced, stiff and strong integral structural insulating board, porous throughout but having its inner portion of relatively high and its skin portions of relatively lower porosity, which consists in forming fiber of wood or woody material and containing at least the principal part of its original lignins into sheets felted from a water bath, introducing the felted material between heated press platens, pressing to a predetermined thickness by forcing the platens relatively toward one another and stopping their motion at a predetermined distance apart sufficient to maintain the desired porosity, whereby when the sheets so held are dried to approximately the fiber saturation point their fibers become set in such relation, and completing the drying while still in the press and subject to the heat thereof without being subject to material pressure.

5. Process of making a true surfaced, stiff and strong integral structural insulating board, porous throughout but having its inner portion of relatively high and its skin portions of relatively lower porosity, which consists in forming fiber of wood or woody material exploded from under high pressure into sheets felted from a water bath, introducing the felted material between heated press platens, pressing to a predetermined thickness by forcing the platens relatively toward one another and stopping their motion at a predetermined distance apart sufficient to maintain the desired porosity, whereby when the sheets so held are dried to approximately the fiber saturation point their fibers become set in such relation, and completing the drying while still in the press and subject to the heat thereof without being subject to material pressure.

In testimony whereof, I have signed my name hereto.

WILLIAM H. MASON.